July 3, 1962  L. F. BONZA ETAL  3,041,668
METHODS FOR FORMING SHEET PLASTICS
Filed Jan. 19, 1956  3 Sheets-Sheet 1
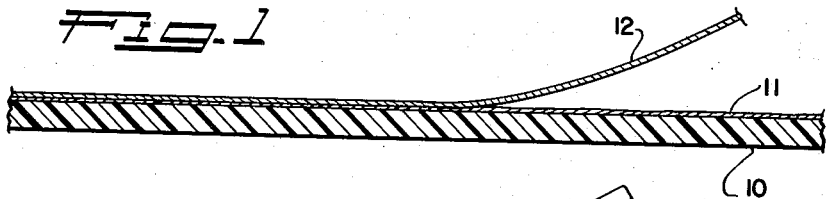
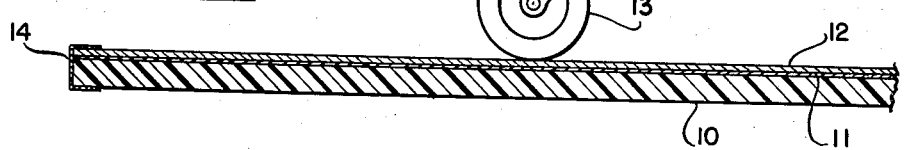
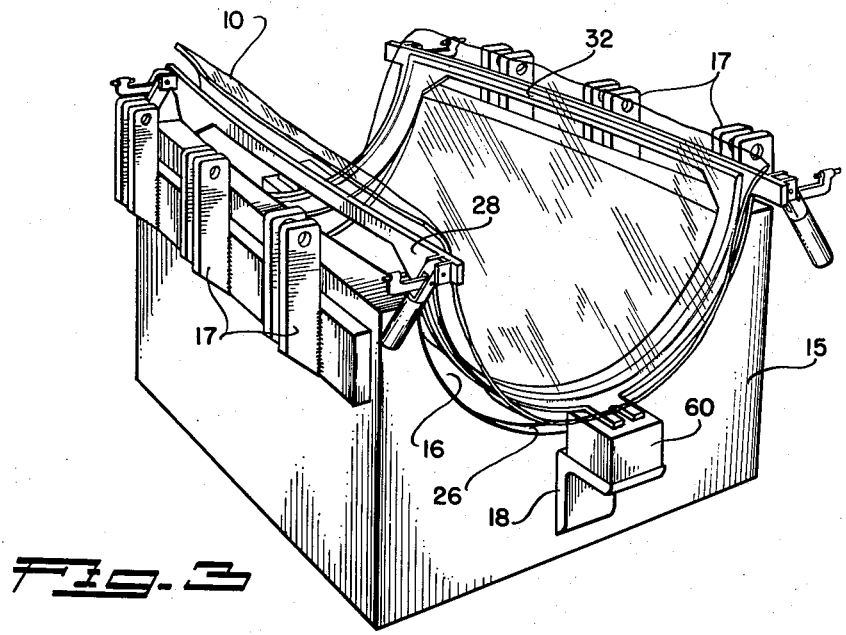
INVENTORS
LOUIS F. BONZA
ANDREW J. BYRNE
BRUCE W. SMITH
By
Agent July 3, 1962  L. F. BONZA ETAL  3,041,668
METHODS FOR FORMING SHEET PLASTICS
Filed Jan. 19, 1956  3 Sheets-Sheet 2
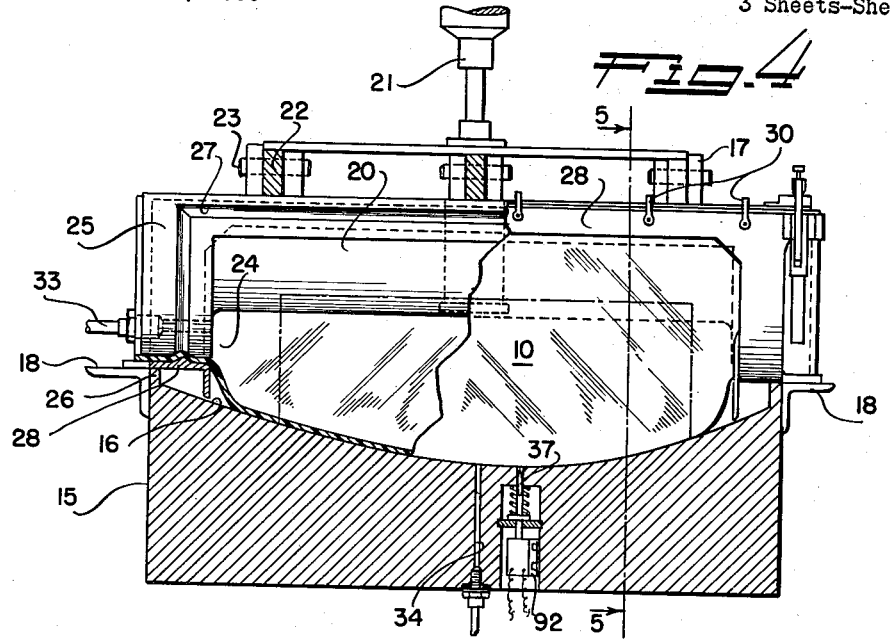
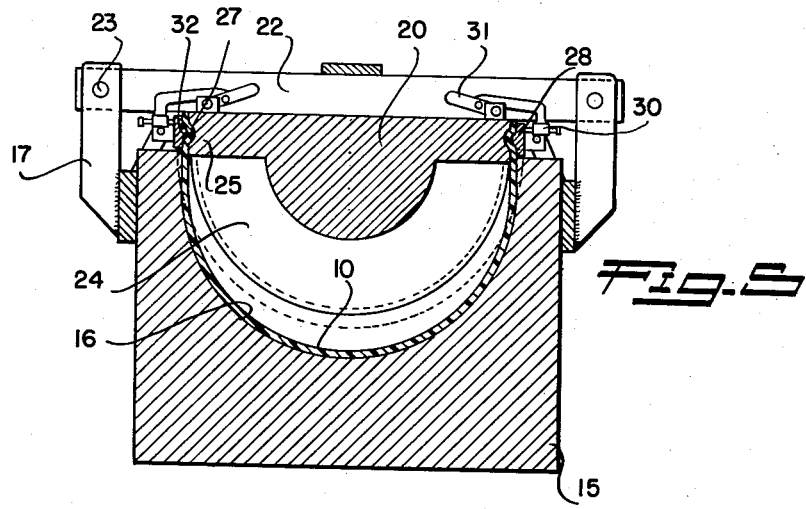
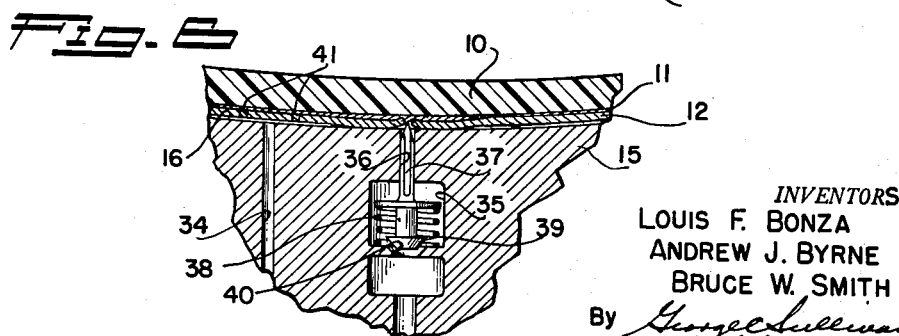
INVENTORS
LOUIS F. BONZA
ANDREW J. BYRNE
BRUCE W. SMITH
By George C. Sullivan
Agent July 3, 1962 L. F. BONZA ETAL 3,041,668
METHODS FOR FORMING SHEET PLASTICS
Filed Jan. 19, 1956 3 Sheets-Sheet 3

INVENTORS
LOUIS F. BONZA
ANDREW J. BYRNE
BRUCE W. SMITH

By George C. Sullivan
Agent

United States Patent Office 3,041,668
Patented July 3, 1962

3,041,668
METHODS FOR FORMING SHEET PLASTICS
Louis F. Bonza, La Crescenta, Andrew J. Byrne, Burbank, and Bruce W. Smith, Pacoima, Calif., assignors to Lockheed Aircraft Corporation, Burbank, Calif.
Filed Jan. 19, 1956, Ser. No. 560,132
1 Claim. (Cl. 18—19)

This invention relates to the shaping or forming of plastics and has more particular reference to the accurate forming of sheet plastics to given contours.

The invention is useful in forming sheet plastic materials, and the like, to various configurations in the manufacture of diversified articles and parts. In the following description reference will be made to the shaping or forming of transparent canopies, astradomes and similar transparent closures and enclosures for use on aircraft, it being understood that such reference is not to be construed as limiting either the scope or application of the invention.

The cockpit enclosing transparent plastic canopies for airplanes have, in the past, generally been free blown, that is blown or formed by the application of air pressure. With the advent of high speed aircraft it has become necessary to accurately form the canopies to given aerodynamically acceptable shapes or contours and because this degree of accuracy cannot be accomplished by the free blown method it has become necessary to attempt to shape or form the transparent plastic sheets in dies. Such attempts have usually been unsuccessful since the engagement between the die surface or surfaces and the transparent plastic sheet, necessary for the accurate shaping of the sheet, has resulted in excessive optical distortion in the finished or shaped part, known in the industry as "mark-off." Such mark-off has many causes and renders the formed sheet or canopy unusable since the canopy, or at least the major portion thereof must be substantially optically perfect to comply with the standards established by the Military Services. The factors that cause or contribute to optically unsatisfactory conditions in the formed sheet during the shaping or forming thereof are an unequal distribution of the grease or lubricant applied to the die surface, trapped bubbles of air between the surfaces of the die and sheet, non-uniform chilling or cooling of the sheet during the forming operation, dirt or dust on the surfaces, and unequal or improper stressing of the material of the sheet. The mark-off can not be corrected or removed by any known method or means and the formed parts rejected because of optical irregularities or defects must be discarded. Since the transparent plastic material is expensive and the forming processes are time consuming, the discarding of any appreciable number of canopies, due to mark-off in any given production run materially increases the cost of the articles.

It is a general object of the invention to provide practical and effective methods for accurately forming transparent plastic sheets to given contours without mark-off or other excessive optical distortion of the sheets.

Another object of the invention is to provide such methods that successfully and accurately form transparent plastics having low elongation characteristics, for example thermosetting plastics. We have discovered methods for forming such plastics that are at best difficult to shape with any reasonable degree of accuracy, said method bringing about the shaping of the sheet to the exact contours and dimensions without mark-off or any other type of optical distortion.

Another object of this invention is to provide a method of the character referred to wherein a film of grease, or the like, free of air bubbles, is maintained on an external surface of the sheet by a thin protective film of polyvinyl chloride, rubber, synthetic rubber, Plexiglas, or the like, which grease layer and film protect the surface of the sheet from dirt and dust and constitute a dual layer "cushion" which engages the female die surface producing optical distortion in the sheet and eliminates or reduces thermal inequalities which might otherwise also cause optical distortion. We have found that the thin film overlying the layer of grease substantially eliminates grease "runs" and maintains the grease in a generally uniform layer so that the grease and film together effectively protect the surface of the warm or heated transparent plastic sheet against the conditions that hereofore produced or contributed to the irreparable optical distortion of the sheet. The grease layer and thin pliable film permit and in fact assist in the accurate conformance of the plastic sheet to the die surface and thus aid in obtaining "sharp" contouring of the transparent plastic sheet. Furthermore, the protective film has high embeddability characteristics and serves to prevent dust particles in the lubricant, on the surfaces or the air from producing surface scratches and/or other marks on the surface of the transparent sheet.

Another object of the invention is to provide a method of this kind wherein the inner surface of the sheet being formed is acted upon by air pressure confined by novel means to avoid direct physical contact of any solid parts with the surface of the critical area of the sheet. Thus the outer side or surface of the sheet being formed is protected and cushioned by the lubricant and pliable film and the inner surface is acted upon or blown only by a gas or air under pressure to leave both surfaces unblemished and substantially optically perfect. In some instances a soft rubber diaphragm may, if desired, be engaged against the inner surface of the sheet and air under pressure is then applied to the diaphragm to exert the forming pressure on the sheet.

Another object of the invention is to provide a method of this kind wherein excessive lubricant or grease is removed or drained from between the surface of the plastic sheet and the protective film to prevent any accumulation of the grease from producing optical distortion in the sheet.

A further object of the invention is to provide a method such as described wherein the plastic sheet may be subjected to edgewise applied compression forces simultaneously with the contour forming forces to assist in shaping or forming the sheet, to assist in distributing the material of the sheet as it is shaped and to avoid or reduce residual stresses in the formed sheet.

Other objectives and features of the invention will become apparent from the following detailed description wherein reference will be made to the accompanying drawings in which:

FIGURE 1 is a fragmentary vertical sectional view of transparent plastic sheet provided with a layer of lubricant on one surface thereof and showing the protective film being applied to the lubricant;

FIGURE 2 is a view similar to FIGURE 1 illustrating the manner in which the lubricant and film are treated to avoid entrapment of air and to lie flat on the sheet;

FIGURE 3 is a perspective view of a female die unit with a heated transparent plastic sheet draped therein preparatory to being formed;

FIGURE 4 is a vertical sectional view showing the sheet clamped to the ram or male die, with the male die locked in the female die and the plastic sheet being formed in the latter;

FIGURE 5 is a vertical sectional view taken substantially as indicated by line 5—5 on FIGURE 4;

FIGURE 6 is an enlarged vertical fragmentary sectional view illustrating the means for draining off excess lubricant;

Figure 7:
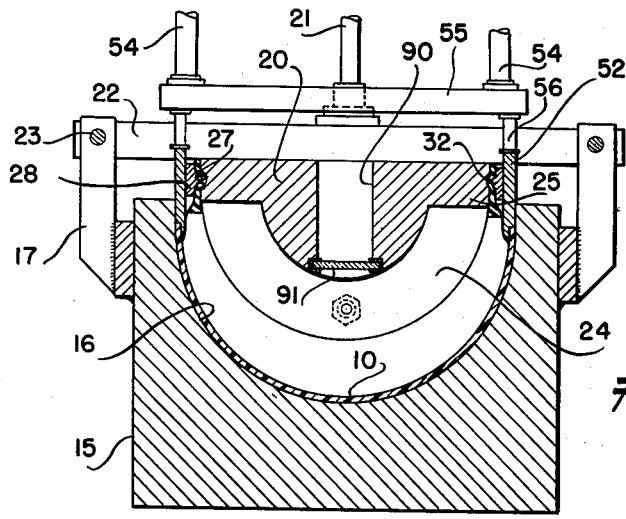
FIGURE 7 is a view similar to FIGURE 5 illustrating another form of apparatus.

The method is useful in forming sheet material of various kinds and have found particular application in the forming of transparent acrylic plastics, laminated acrylic plastic sheets, cross-linked acrylic sheet material such as "Polymer K" manufactured by Rohm and Haas Company, chlorinated acrylic sheet materials such as "Gafite" manufactured by the General Analine and Film Corporation, "Plexiglas," transparent polyester materials such as "Sierracin" manufactured by the Sierracin Corporation, the other transparent sheet plastic materials useful in the fabrication of airplane canopies, astradomes, windows, windshields, and the like.

In the drawing, the numeral 10 designates a sheet of transparent plastic material such as above described. In accordance with the invention it is preferred to prepare at least one surface of the sheet 10 to protect the same, to prevent or avoid mark-off, "orange peel" effects, etc. during the forming operations. Thus in FIGURE 1 we have shown a film or layer 11 of a suitable grease or lubricant such as "Oronite," manufactured by Oronite Chemical Co., applied to a surface of a sheet 10 to cover the same. Following the application of the lubricant layer 11 a thin film 12 of polyvinyl alcohol, cellophane, rubber, synthetic rubber, or other flexible pliant and yielding material is layed or superimposed on the lubricant protective layer. This film 12 is impervious to the lubricant 11, presents smooth regular surfaces and is imperforate and continuous except that it may be perforated or made foraminous in a region of limited area as will be later described. The film 12 is also adapted to withstand the temperatures to which the sheet 10 is subjected prior to and during the actual forming operations. In practice the grease or lubricant layer 11 may be between .001 and .060 inch thick and the impervious film 12 may be between .010 and .051 inch thick.

In order to obtain a lubricant layer 11 of substantially uniform thickness and to remove all voids and air bubbled from between the film 12 and the surface of the sheet 10, we prefer to roll or otherwise progressively work the film 12. In FIGURE 2 we have shown a roller 13 acting or rolling on the film 12 to even out the lubricant layer 11 and to remove air bubbles from between the film and the sheet. This evening or rolling of the surface protective film 12 and lubricant layer 11 is preferably performed after a pre-heating of the sheet to a temperature of, say 150° F. and prior to the final heating and engaging the sheet in the die assembly. Tape 14, preferably of the self-adhering and lubricant impervious type, is engaged over the edges of the sheet 10 and film 12, as shown in FIGURE 2, to assist in retaining the lubricant between the surface of the sheet and the film 12 and to assist in preventing displacement of the superimposed lubricant and film. It may be preferred to apply the tape 14 subsequent to the heating of the sheet 10 and prior to the arrangement of the sheet in the forming die means. Although we have shown the lubricant layer 11 and film 12 on one surface of the sheet 10 it is to be understood that both surfaces of the sheet may be protected in this manner if desired or found necessary.

The character of the die means employed in carrying out the method of the invention will, of course, depend to some extent upon the nature, size and configuration of the parts to be formed. In the drawings we have shown die units or assemblies suitable for the shaping and forming of transparent plastic airplane canopies of double or compound curvature. Since these canopies are to cover or enclose the upper side of the one place or two place cockpit of the airplanes they are of substantial length and width and in order to conform with the aerodynamic considerations and design of the modern high speed aircraft, the canopies must be accurately shaped and usually formed to compound contours. Thus, as best illustrated in FIGURES 4 and 5, the sheet 10, which is to constitute a canopy, is curved both transversely to be of generally channel shape and longitudinally to have a "bulb" like area of increased height and depth toward one end. The die means includes a female die 15 having a cavity 16 corresponding to the configuration and final approximate dimensions of the finished cavity. This cavity 16 is smoothly and accurately surfaced and finished whereby the canopy or sheet 10 may be shaped or formed thereagainst. Longitudinally spaced clevises 17 project from the upper side of the die 15 at each side of the cavity. Brackets 18 are provided on the die at each end of the cavity.

The die means, as shown in FIGURES 3, 4 and 5, further includes a male die or plug 20 shaped to conform in a general way with the cavity 16 although designed or shaped so as to not engage in or correspond with the sheet shaping major area of the female die cavity. The plug 20 is adapted to be moved into and out of its active position with respect to the female die 15 by a ram 21, or the equivalent, acting on and secured to bars 22 on the upper or outer side of the plug. The outer ends of these bars 22 protrude beyond the sides of the plug 20 and are adapted to enter the clevises 17 on the female die 15 and to be removably secured therein by pins 23 to hold the plug in the die during the sheet forming operations. The major portion of the lower or active convex side of the plug 20 is relieved or provided with a rather extensive cavity or recess 24 which, as will be later described, forms an air pressure chamber for the sheet forming air under pressure which presses or forms the sheet 10 against the die cavity 16. The plug 20 has what may be considered a rim 25 extending along both sides and both ends of the recess 24. The longitudinally extending side regions of this rim 25 conform generally with the longitudinal mouth regions of the female cavity 16 and the end portions of the rim 25 are approximately partially cylindrical in shape to oppose upstanding ridges 26 of complimentary shape on the ends of the die 15. A continuous groove 27 is provided in the rim 25 to assist in retaining or locking the sheet 10 to the plug 20, as will be later described.

In the form of apparatus being described, a clamping device or means is employed to secure the marginal portions or faying edges of the sheet 10 to the plug. This means includes a clamp ring 28 for pressing or clamping the edge regions of the sheet 10 on the rim 25 of the plug 20. The ring 28 is shaped and proportioned to fit around and conform to the rim 25 with clearance so that the edge portions of the sheet 10 may be engaged therebetween. Spaced quick acting toggle clamps 30, or the equivalent, are mounted on the plug 20 and are manually operable by handles 31 to forceably press or clamp the ring 28 inwardly against the edge regions of the sheet 10 and thus secure the edges of the sheet on the rim 25 of the plug. The clamp ring 28 has a ridge 32 on its inner side opposing the groove 27 in the rim 25. Upon actuation of the clamps 30 the ridge 32 distorts the material of the sheet 10 into the groove 27 to more securely attach and seal the margins of the sheet to the plug 20. It will be observed that with the construction thus described a heated, relatively soft plastic sheet 10, either preformed to the approximate final configuration or merely draped into the female die, may be quickly secured and sealed to the rim 25 of the plug 20 so that the sheet forms an imperforate closure for the air chamber or recess 24. Means is provided for introducing air, or the equivalent, under pressure into this sealed recess 24 to shape or form the sheet 10 to the cavity 16 of the female die 15. This means may include a line or pipe 33 entering an end of the plug 20 to discharge into the recess 24. The pipe 33 may be connected with any suitable or available source of fluid under pressure, not shown.

It may usually be preferred to exert a negative pressure on the outer or lower side of the plastic sheet 10 when engaged in the die 15 to assist the superatmospheric pressure in the shaping or forming of the sheet. For this purpose one or more ducts 34 extend through the die 15 to the lower portion of the die cavity 16 and their outer ends may be connected with a source of negative pressure or vacuum, not shown.

It is to be understood that in performing a method of the invention the sheet 10 provided with the layer of grease 11 and the outer protective film 12 is heated and then arranged to have the protected side oppose and finally engage in the die cavity 16. The pre-heating of the sheet 10, the draping of the sheet in the die cavity, and the forces and pressures acting on the sheet during the shaping thereof, may cause some displacement or "running" of the softened lubricant to form a relatively small body of excess lubricant between the face of the sheet and the film 12. This region of excess lubricant is usually in the lowest part of the partially formed sheet 10 means are provided for draining off any such accumulated excess lubricant to prevent the same from producing optical distortion of the sheet. This means may be as illustrated in FIGURE 6 where a lubricant receivinng chamber 35 is formed in the die 15 and a duct 36 leads from the chamber 35 to the wall of the die cavity 16 at the lower or lowest region thereof. A needle 37 is movable in the duct 36 and is grooved to permit fluid flow therearound. A spring 38 yieldingly urges the needle 37 upwardly to have its point at the surface of the die cavity 16. The needle 37 is operable to perforate the thin plastic or rubber film 12, as shown in FIGURE 6, to permit the escape of the excess lubricant through the duct 36 into the chamber 35. A valve 39 is carried by the needle 37 and closes against a seat 40 when the needle is depressed through contact with the sheet 10 or by the action of the hydraulic pressures on the layer 11 of lubricant. The closing of the valve 39 prevents an excessive draining off or expulsion of the lubricant 11 which, as will be apparent, is subject to high pressures during the sheet forming operations. As an alternative for or in addition to the lubricant removing means just described, the film 12 may be perforated in the lowermost portion of the sheet 10 and in a limited region as shown at 41 to allow accumulated excessive lubricant to be drawn out through the vacuum duct or ducts 34.

Figure 8:
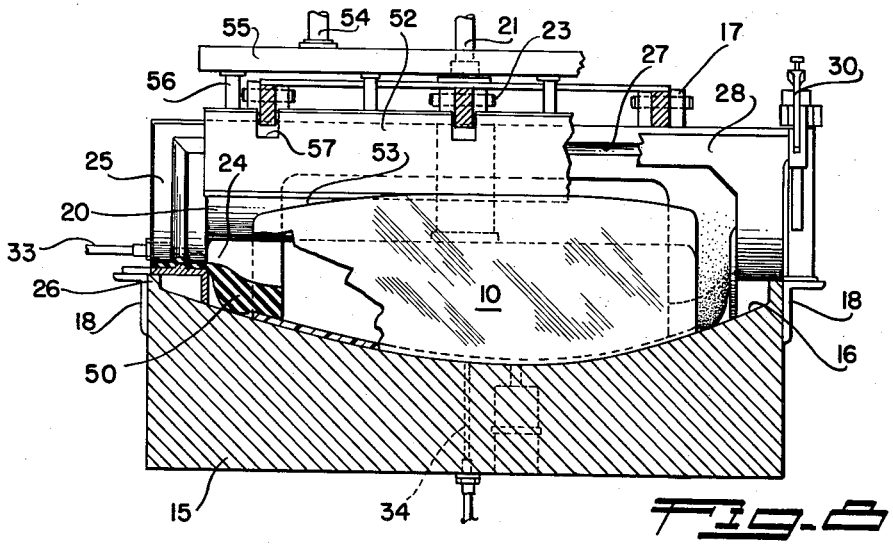
FIGURE 8 is a view similar to FIGURE 4 illustrating the apparatus shown in FIGURE 7.

The apparatus illustrated in FIGURES 7 and 8 includes the female die 15 and the plug 20 which may be the same as in FIGURES 3, 4 and 5, the dies being equipped with the clevises 17, bars 22, and pins 23, substantially as above described, and the plug 20 being raised and lowered by a suitable ram 21 or the equivalent. In this form a pressure-tight seal is provided along the margins of the sheet 10 when engaged in the die set, a gasket-like element or bag, or if desired, a diaphragm of rubber, or the like, being employed to effect this seal. Furthermore, in this form of the apparatus the material of the sheet 10 is subjected to edgewise compression forces which assist in the forming or shaping sheets of transparent plastic sheet material such as Sierracin and Polymer K that are characterized by the properties of brittleness and low yield strength at the forming temperatures.

The above mentioned sealing element or bag 50 is constructed of rubber, synthetic rubber, or the like, and is engaged on the rim 25 of the plug 20 to be secured thereto by the clamp ring 28. This sealing element 50 may be a specially constructed gasket-like part or may be a bag cut out or cut away to constitute a gasket-like sealing element for conforming to the rim 25 and for overlapping and sealing with the internal surfaces of the marginal regions of the plastic sheet 10. As illustrated in FIGURE 8, the end portions of the sealing element 50 are thickened to conform with the concave ends of the die cavity 16 and the sheet 10. These thickened regions of the bag 50 protrude freely inward from the rim 25 and clamping ring 28 to be urged or actuated into sealing contact with the die cavity 16 and the sheet 10 by the superatmospheric air pressure admitted to the cavity 24 by the pipe 33. It will be observed that with the sealing construction just described and with the apparatus illustrated in FIGURES 3, 4 and 5, the optically critical major area of the plastic sheet has its inner surface acted upon and engaged by air only and therefore is not subject to surface deformation, mark-off, orange peel effects, or the like, that might affect the optical properties of the finished formed sheet. If desired, the sealing element 50 may be a continuous diaphragm-like part for extending across and covering the inner surface of the sheet 10 and thus transmit the forming superatmospheric pressure to the sheet 10. In such cases it will be preferred to provide the above described lubricant layer 11 and plastic film 12 on the inner surface of the sheet 10 as well as on its outer surface.

The edgewise compression forming forces are imposed on or applied to the plastic sheet 10 by what we will term compression bars 52. These bars 52 may enter the upper end of the die cavity 16 adjacent the side parts of the clamp ring 28 to engage directly against the upper edges of the sheet 10. The lower edges of the bars 52 may preferably be flanged or stepped to engage the upper edges of the sheet 10 and to overlap the inner surfaces of the sheet to a limited extent. Where the canopy or the like is to have double or compound curvature we may pre-cast, pre-form or pre-cut the sheet to have convex upper edges as at 53 in FIGURE 8. The shape or convexity of the edges 53 is related to the compound curvature so that the substantially straight bars 52 pressing downwardly against the heated and softened sheet 10 will displace or assist in displacing the material of the sheet to the regions of greatest curvature or "bulging" and thus avoid thinning out of the sheet and the establishment of excessive residual stresses. The compression forming action of the bars 52 is concurrent or simultaneous with the forming of the sheet 10 to the female die cavity 16 by the superatmosspheric air pressure in the chamber 24 and the negative pressure exerted through the duct or ducts 34. The compression forming bars 52 are actuated by rams 54 or the equivalent, acting on the bars through the medium of equalizing rods 55 and vertical pins 56. The upper edges of the compression bars 52 may be notched, as at 57, to have adequate clearance with the rods 22.

In employing the method of the invention with the apparatus of FIGURES 3 to 5 inclusive, the die 15 is heated to the approximate forming temperature and a thin film of oil, grease, or other lubricant is applied to the surface of the die cavity 16. The transparent plastic sheet 10 is cut to shape and approximate size and provided with the layer 11 of lubricant and the protective film 12 as above described prior to being heated in an oven or the like to a temperature of from 200 to 375° F. or higher, depending upon the material of the sheet. The sheet 10 may be a simple flat sheet prior to heating and forming or may be a pre-shaped part to have a partially tubular configuration, such pre-shaping being effected by casting or other means prior to the heating step of the method, the preforming being desirable in the case of transparent plastic materials that are brittle and difficult to form. Upon being heated, as above described, the plastic sheet 10 is draped over the female die 15 with its protected surface facing the die, that is with the film 12 opposing the cavity 16 and the sheet is engaged into the clamp ring 28. At this stage of the operation the clamp ring 28 is supported on the brackets 18 by blocks 60, as shown in FIGURE 3, to prevent direct contact of the heated sheet 10 with the female mold or die 15 to avoid optical chill marks. The punch 20 is then lowered to engage the marginal regions of the sheet 10 between the rim 25 and the clamp ring 28 and the clamp ring is securely locked or actuated by the clamps 30. This provides a continuous air tight seal between the plastic sheet 10 and the rim 25 of the plug 20. The blocks 60 are then removed and the plug 20 is lowered to move the cross bars 22 into their clevises 17. The pins 23 are engaged through the clevises and bars 22 to lock the plug 20 in the mold or die 15. Air under superatmospheric pressure is then admitted through the pipe 33 into the recess or chamber 24 and reduced pressure or vacuum is applied through the ducts 34. The air under pressure in the recess or chamber 24 acts upon the upper or inner side of the sheet 10 to force the sheet into accurate conformance with the die cavity 16, assisted to some extent by the vacuum applied through the ducts 34, the latter also serving to draw off excess grease from the die assembly. The thin, flexible plastic film 12, together with the layer 11 of lubricant, cushions and protects the outer surface of the sheet 10, absorbing dust marking and otherwise preventing optical distortions from developing in the surface region of the sheet 10. Also, as above described, the needle 37 may perforate the film 12 to permit the discharge of accumulated excess lubricant at the surface of the sheet 10. The forming operation is quickly accomplished, a period of approximately one (1) minute from the removal of the sheet from the oven normally being sufficient to effectively form the sheet to the mold or die 15. The sheet 10 is permitted to cool for a reasonable period in the mold or die assembly, a cooling period of from 5 to 15 minutes usually being adequate. The air pressure is relieved from the chamber 24 and the negative pressure source is disconnected from the ducts 34 prior to removing the part from the mold which is readily accomplished by removing the pins 23, bars 22 and freeing of the clamps 30. The lubricant 11 and film 12 are readily removed from the formed sheet 10.

The method as employed with the apparatus illustrated in FIGURES 7 and 8 of the drawings is substantially the same as just described. However in this procedure the compression bars 52 are engaged against the upper edges of the shee 10 subsequent to the engagement and securing of the sheet in the mold or die set. Concurrent or simultaneous with the application of the forming air pressure to the internal or upper surface of the sheet 10 the rams 54 are actuated so that the compression bars 52 exert an edgewise compression forming force on the sheet 10. This, coupled with the air pressure forming forces aids in accurately shaping a sheet 10 to the mold cavity 16, prevents thinning of the sheet, facilitates the shaping of the sheet to rather abrupt or sharp contours and may serve to prevent the development of excessive residual stresses in the formed sheet.

Figure 9:
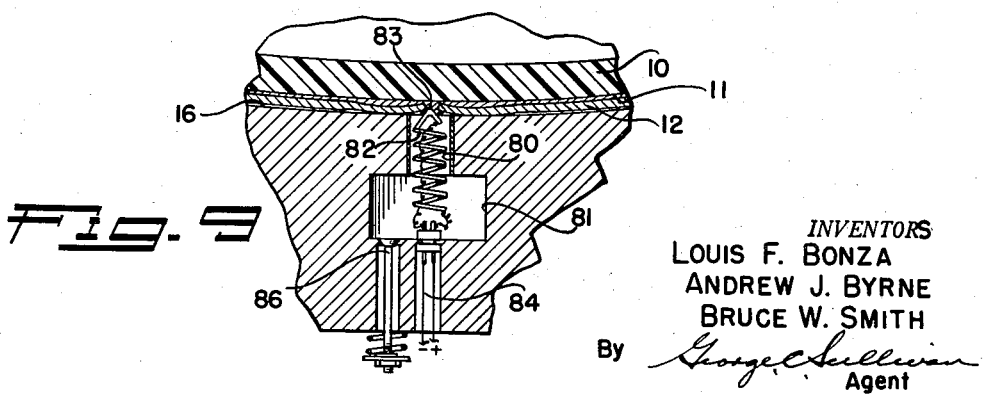
FIGURE 9 is a view similar to FIGURE 6 illustrating another means for draining off excess lubricant.

FIGURE 9 illustrates another means for draining excess lubricant from between the protective film 12 and the face of the sheet 10. In this construction a duct 80, lined with a dielectric and heat resistant material, leads from the wall of the die cavity 16 at the lower region thereof to a sump chamber 81. An electrical resistance heating wire or element 82 is arranged in the duct 80 and its upper end is formed to a point 83 which protrudes slightly or is exposed at the face of the die cavity. The element 82 may be an open tubular coil to permit the free flow of lubricant through the duct 80. The electrical leads 83 for energizing the element 82 extend from the die 15 to be conveniently controlled by a switch (not shown). A manually operated or remotely controlled valve 86 is provided in the die 15 to permit the removal of accumulated excess lubricant from the chamber 81.

While we have shown the compression bars 52 employed with apparauts incorporating the bag or sealing element 50, it is to be understood that the sealing element 50 may be used in situations where the compression bars 52 are unnecessary and omitted and the bars 52 may be used in cases where the sealing element is not required or omitted.

In order that the operators may more conveniently observe the forming action of the sheet 10, one or more window openings 90 are formed in the male die or plug and the lower ends thereof are closed by suitable lenses 91. A suitable coloring dye, such as Prussian Blue, may be incorporated in the lubricant provided between the protective film 12 and the surface of the sheet 10 and the operators, by observing through the window openings 90 may determine the thickness of the lubricant film as the forming operation progresses. If it is noted that the lubricant film is becoming excessively thin the forming pressures may be reduced or merely maintained to prevent undue displacement of the lubricant.

It is to be understood that the viewing openings 90 may be incorporated in any apparatus and the lubricant draining systems of FIGURES 6 and 9 may likewise be incorporated in any of the apparatus as may be found most practical. In this connection it should be observed that FIGURE 4 illustrates a slight modification of the type of lubricant draining means such as shown in FIGURE 6. In FIGURE 4 the needle 37 is operated by a remotely controlled solenoid 92 so as to be extended and retracted at the will of the operator.

Having described only typical forms of the invention we do not wish to be limited to the specific details herein set forth, but wish to reserve to ourselves any variations or modifications that may appear to those skilled in the art and fall within the scope of the following claim.

We claim:

The method of forming a transparent plastic sheet part comprising arranging a layer of lubricant on a first face of the sheet part, arranging a thin flexible film on said layer, heating the part to a plastic condition, arranging the heated part with the film in adjacent facing relation to a die surface, then applying air pressure to the other face of the sheet part to form said first face and film to the die surface, bleeding accumulated excess lubricant from between the part and film during forming of the part and then removing said layer and film from the part.

References Cited in the file of this patent

UNITED STATES PATENTS

| | | |
|---|---|---|
| 1,665,355 | Gustafson | Apr. 10, 1928 |
| 2,142,445 | Helwig | Jan. 3, 1939 |
| 2,365,637 | Helwig | Dec. 19, 1944 |
| 2,367,642 | Helwig | Jan. 16, 1945 |
| 2,408,245 | Walter | Sept. 24, 1946 |
| 2,440,499 | Ames et al. | Apr. 27, 1948 |
| 2,462,940 | Bowes | Mar. 1, 1949 |
| 2,515,093 | Mills | July 11, 1950 |
| 2,599,554 | Howenstine | June 10, 1952 |
| 2,648,099 | Dunmire | Aug. 11, 1953 |
| 2,662,248 | Ames | Dec. 15, 1953 |
| 2,750,624 | Coates et al. | June 19, 1956 |
| 2,750,625 | Colombo | June 19, 1956 |

OTHER REFERENCES

Bailey: "Blow Molding Opens Opportunities to Plastics" in Plastics, vol, 2, No. 4, April 1945, pp. 70, 72, 74, 75, 118–120. Published by Ziff-Davis Pub. Co., Chicago, Illinois.